May 13, 1924.

E. H. KREIDER

SHOCK ABSORBER

Filed Feb. 24, 1922

WITNESSES

INVENTOR
E. H. Kreider
BY
ATTORNEYS

May 13, 1924.
E. H. KREIDER
SHOCK ABSORBER
Filed Feb. 24, 1922
1,493,884
2 Sheets-Sheet 2
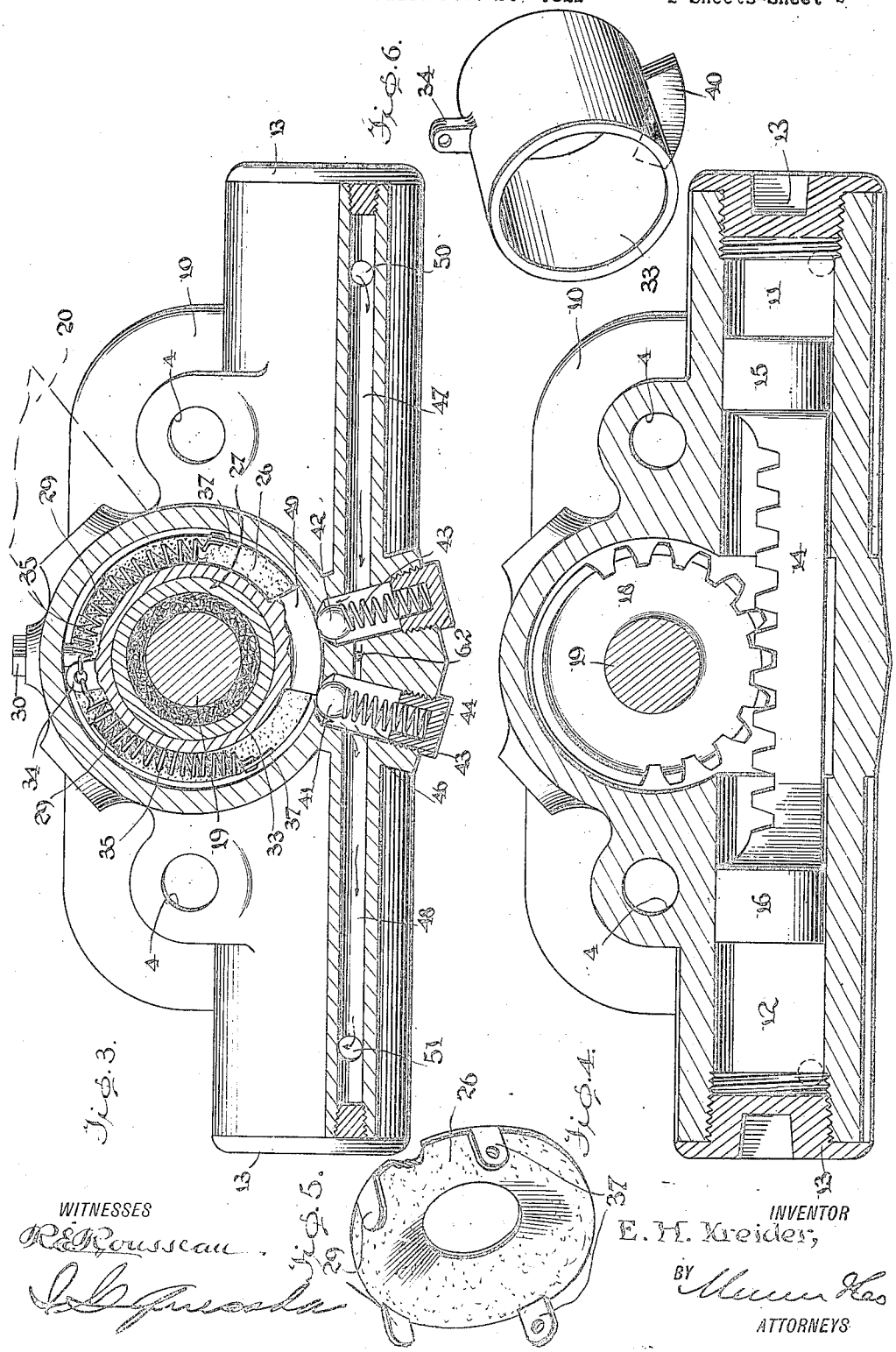

Patented May 13, 1924.

1,493,884

UNITED STATES PATENT OFFICE.

ENOS HENRY KREIDER, OF LANCASTER, PENNSYLVANIA.

SHOCK ABSORBER.

Application filed February 24, 1922. Serial No. 538,846.

*To all whom it may concern:*

Be it known that I, ENOS H. KREIDER, a citizen of the United States, and resident of Lancaster, in the county of Lancaster and State of Pennsylvania, have invented certain new and useful Improvements in Shock Absorbers, of which the following is a specification.

This invention relates to shock absorbers especially adapted for application to motor vehicles.

An important object of this invention is to provide a shock absorber which acts to efficiently check the rebound of the spring whereby the occupants of a vehicle are not rendered uncomfortable as a result of the vehicle encountering inequalities in a roadway.

A further object is to provide a shock absorber which does not in any way interfere with the flexing of the spring when bending to adjust itself to the inequalities in the roadway and which functions only to check the rebound of the vehicle.

Further the invention aims to provide a shock absorber including means which functions only when the flexing of the spring exceeds a predetermined point so that the main spring or springs, as the case may be, are allowed to absorb the minor shocks.

A further object of the invention is to provide a shock absorber which may be conveniently applied to motor vehicles of various descriptions without substantially altering the construction of the vehicle and without marring the appearance of the same.

Further the invention aims to provide a shock absorber which is of highly simplified construction, durable in use and cheap to manufacture.

Other objects and advantages of the invention will be apparent during the course of the following description.

In the accompanying drawings forming a part of this application and in which like numerals are employed to designate like parts throughout the same.

Figure 3 is a longitudinal sectional view through the improved shock absorber, the view illustrating a pair of valves and the means for holding the same in open position under normal conditions.

Figure 4 is a longitudinal sectional view through the improved shock absorber, the view illustrating a pair of pistons embodied in the invention and a rack for moving the pistons longitudinally within the oppositely located chambers.

Figure 5 is a perspective view of a washer embodied in the invention.

Figure 6 is a perspective view of a collar embodied in the invention and which is provided with means for normally holding the valves in open positions.

Figure 1:
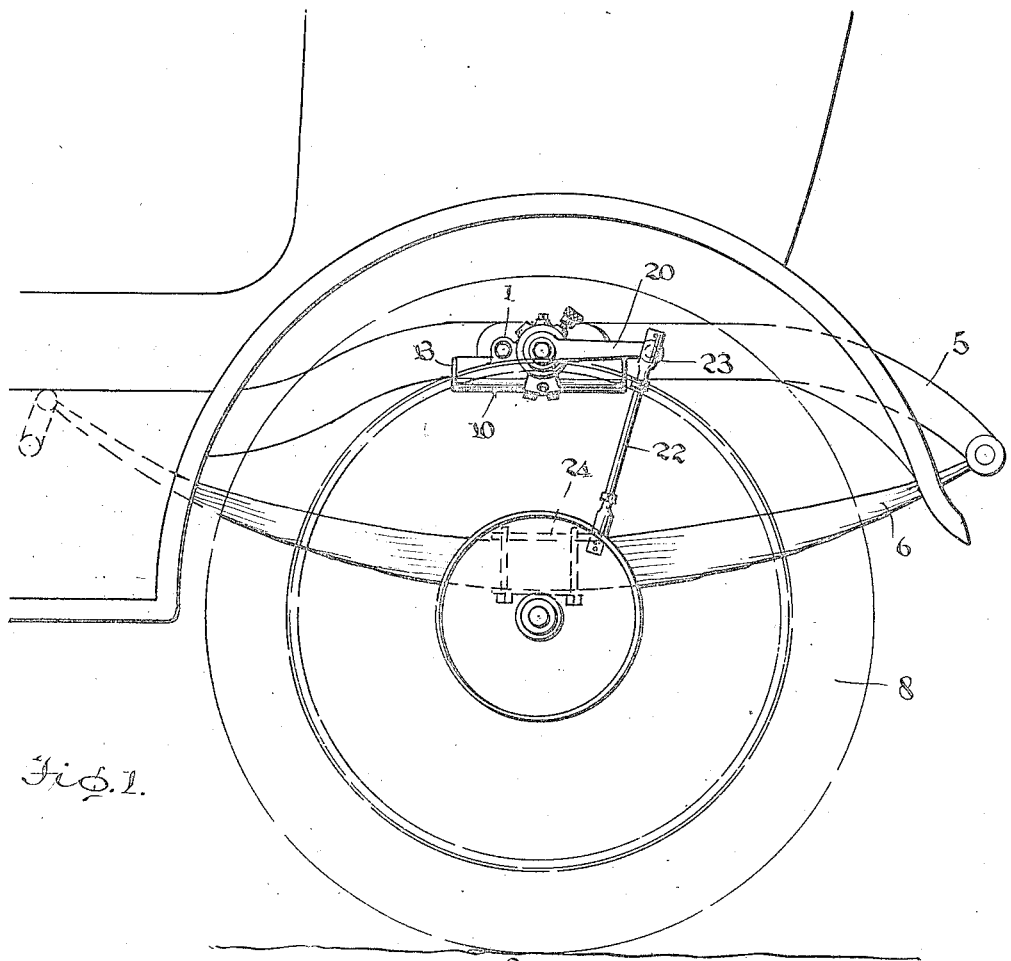
Figure 1 is a side elevation of the improved shock absorber applied.

In the drawing wherein for the purpose of illustration is shown a preferred embodiment of the invention the numeral 5 designates the frame of a motor vehicle and the numeral 6 indicates a spring, which incidentally, may be of any desired type, such as semi-elliptical as shown, three-quarter elliptical or full elliptical. Also the inventive idea involved in this application may be carried out in connection with springs of any desired type. As illustrated in Figure 1 the rear axle of the vehicle is provided with the usual wheels 8 which by reason of the presence of the springs 6 move vertically upon encountering inequalities in the roadway.

As is well known when the vehicle wheel encounters a depression it rides into the depression thereby causing the spring 6 to adjust itself to this position and the weight of the vehicle body causes the same to lower after the downward bending of the spring. It is this subsequent movement of the vehicle body that this invention aims to check.

On the other hand when the vehicle wheel encounters an obstruction such as a bump, the wheel moves upwardly and the vehicle body subsequently partakes of an upward movement to adjust itself to this new condition. This subsequent movement of the vehicle body renders riding unpleasant and in carrying out the invention this upward movement is greatly reduced and rendered gradual.

The body of the improved shock absorber is designated by the numeral 10 and is provided with openings 4 adapted for the reception of fastening devices of any suitable type such as bolts or rivets.

The body or casing is secured directly above the axle with which it is associated and is provided with longitudinally aligned main fluid receiving chambers 11 and 12 having their ends closed by plugs 13.

As illustrated in Figure 4 a rack 14 is arranged in the casing and is provided at its ends with pistons 15 and 16 which reciprocate within the chambers 11 and 12 so as to cause a pressure on the fluid contained within the cylinders and it is this pressure which is utilized as a means to check the spring action.

Figure 2:
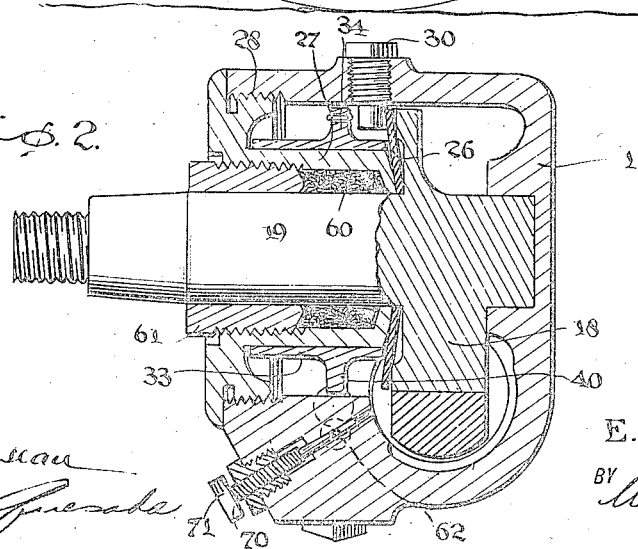
Figure 2 is a vertical transverse sectional view through the same.

The rack 14 is provided along its upper edge with teeth which mesh with a gear 18 formed integral with a main shaft 19 extended through the casing in the manner illustrated in Figure 2.

The extended terminal portion of the shaft 19 has connection with a radially arranged arm 20 which in turn is connected to a link 22 through a ball and socket connection as indicated at 23.

The lower portion of the link 22 is connected to the spring 6 as indicated at 24 so that when the spring moves vertically the link 22 and consequently the arm 20 will be moved vertically. This initial movement of the arm 20 in one direction does not create a retarding pressure but it is only on the return stroke of the arm 20 that the pressure is created.

As illustrated in Figure 2 an annulus or washer 26 is mounted on the shaft 19 and is pressed tightly into engagement with the gear 18 by means of a stuffing box 27. The stuffing box is threaded into the casing as indicated at 28 and may be adjusted for adjusting the friction between the annulus 26 and the gear. The friction between the annulus 26 and the gear causes the annulus to rotate with the gear within the limits prescribed by the ears 29 and a stop element 30 in the form of a screw bolt. The stop element 30 is threaded through the top of the casing and is arranged in the path of travel of the pair of lugs 29 so that when the annulus is rotated by the rotation of the shaft 19 one of the lugs will engage the stop element whereby to limit or stop the further rotation of the annulus.

A collar illustrated in detail in Figure 6 is designated by the numeral 33 and as illustrated in Fig. 2 is rotatably mounted on the stuffing box 27. The collar 33 has its upper side provided with a radially projecting apertured ear 34 to which a pair of coiled springs 35 are connected. The coiled springs are connected at their lower ends to apertured ears 37 extending laterally from the lower portion of the annulus. It will be seen that when the annulus is rotated the tension of one of the springs 35 will be decreased while the tension of the other spring will be increased whereby to cause the collar 33 to rotate.

The lower portion of the collar 33 is provided with a radially extending arcuate lug 40 which normally holds the spherical valves 41 and 42 open to permit of the free passage of fluid. Attention is directed to Figure 2 wherein the arcuate lug 40 is shown as being considerably less in width than the valve opening so that the lug does not seriously interfere with the free passage of fluid past the ball valves 41 and 42.

A slight oscillation or rocking of the collar 33 does not remove the arcuate lug 40 from engagement with the balls 41 and 42 so the balls are normally held in their unseated positions.

Therefore, when the spring 6 is only slightly flexed the spherical valves 41 and 42 will remain open.

On the other hand when the spring action exceeds a predetermined point, one of the valves is caused to seat while the other valve is held in its unseated position by the rib 40. The sphere shaped valves 41 and 42 are provided with coiled springs 43 which are held in position by adjustable nuts 44 threaded into the bottom of the casing.

The ball valves 41 and 42 are, as illustrated in Figure 3, interposed in the lateral branches 46 of longitudinally extending passages 47 and 48. The ends of the longitudinally extending passages 47 and 48 are provided with lateral branches 50 and 51 respectively which establish communication between the fluid containing chambers and the longitudinally extending passages.

Under normal conditions both the valves 41 and 42 are held open so that pressure created by the movement of the piston 15 and 16 will force the liquid freely through the passages 47 and 48.

The shaft 19 is as illustrated in Figure 2 surrounded by a packing 60 held in place by means of a nut 61. And the slight leakage which may occur about the shaft 19 effectively lubricates the shaft.

Assuming that the parts are positioned as illustrated in Figure 1 and the vehicle encounters a bump in the roadway this will cause the wheel 8 to move upwardly. This upward movement elevates the link 22 and moves the arm 20 upwardly so that the gear 18 is rotated.

This rotation of the gear 18 in a counter clockwise direction imparts a similar movement to the annulus 26. When the annulus 26 is thus moved in a counter-clockwise direction the tension of the spring on the left hand side of Figure 3 is increased and the tension of the other spring is decreased thus rocking the collar 33 in an anti-clockwise direction.

This anti-clockwise movement of the collar 33 allows the valve 41 to seat and holds the valve 42 in an unseated position. Of course, during the upward movement of the arm, the rack 14 is moved longitudinally in the direction of the chamber 11 so as to create a pressure on the liquid in the chamber 11. The liquid from the chamber 11 flows into the passage 47 as indicated by the arrows in Figure 3 and the liquid under pressure passes through the unseated valve 42 and enters the passage 48 as the chamber 12 is constantly enlarging. However, when the arm 20 begins its return stroke its movement is checked or retarded as the rack 14 moves to the left in the direction of the chamber 12 to create a pressure on the liquid in the chamber 12. This pressure created in the chamber 12 forces the liquid into the passage 48 and the liquid will of course be prevented from passing the ball valve 41 which is seated because of the position of the arcuate lug 40. This liquid under pressure in the passage 48 is caused to pass through a by-pass 62 which establishes communication between the passages 47 and 48. By reason of the restricted cross sectional area of the by-pass 62 the movement of the liquid is slow so that the return movement of the arm 20 is greatly retarded. By thus retarding the return movement of the arm 20 the objectionable rebound of the spring is prevented thereby reducing objectionable shocks to a minimum.

With reference to the foregoing description it will be seen that the rib or lug 40 holds the valves 41 and 42 open so that the device functions only when the shock is a major one, thereby allowing the spring to absorb the minor shocks. Also it will be seen that the shock absorber does not in any way interfere with the original springing action of the spring and acts only to check rebounds.

If the stroke continues beyond the neutral position, the moment the stroke reverses the liquid pressure ceases and the segment quickly turns to the other side and one ball valve opens while the other closes, and the return stroke will again be accompanied by the retarding effect by the high pressure occurring in one of the chambers. This opposing action will continue until a neutral position is again reached, when the arcuate lug will hold the valves open as before.

Assuming that the wheel suddenly drops into a depression of sufficient depth to cause the rocking of the collar 33 and the closing of one of the valves the crank arm moves downwardly, thus allowing the spring and the wheel to quickly move into position with the least tendency of disturbance to the body of the car, but the body in its tendency to follow the downward course is instantly met with resistance by the device which continues until the stroke reverses and is therefore again settled to its normal position.

With reference to the foregoing description it will be seen that the natural resiliency of the spring is not in any way interfered with except on the rebound stroke when the rapid rebound is prevented.

Also the device does not in any way interfere with the running gear of the vehicle and may be quickly and conveniently applied to a vehicle of any desired type without elaborately altering the construction of the same.

Also the resisting or checking effect of the device is largely in proportion to the severity of the spring action.

As illustrated in Figure 2 the by-pass 62 is controlled by means of a needle valve or adjusting stem 70 extended exteriorly of the casing and having its head 71 by means of which the same may be adjusted so that the return motion of the arm 20 may be regulated.

On the return motion of the collar 33 the pressure on the valve 41, if that valve is the one which is closed will be ample to hold the radial lug 40 in its original position so that the valve 41 will not be unseated.

Assuming that a wheel with which the shock absorber is associated is surmounting an obstruction sufficiently high to require the services of the shock absorber the operating arm 20 will be swung upwardly so that the ball valve 41 will be seated and the ball valve 42 will be maintained in its unseated position, thus making it impossible for the rack and the pistons to create a pressure high enough to interfere with the normal spring action. After such movement the return stroke starts and resistance is created and the pressure beneath the ball valve 41 is sufficient to hold the same seated and thereby momentarily prevent the rib 40 from unseating the valve 41. That is to say, the pressure beneath the ball valve 41 is sufficient to hold the same seated notwithstanding the force supplied by the rib 40.

It is thus seen that the return of the arm 20 is delayed and the checking action is largely in proportion of the shock encountered and in proportion to the road conditions.

It will be seen that the action of the improved shock absorber is automatically intensified as the road conditions roughen, so that the device is adapted for use on rough as well as comparatively good roads.

Having thus described the invention, what is claimed is:—

1. A shock absorber comprising a casing, a shaft arranged therein and having a gear, a rack associated with said gear and having oppositely located pistons, said casing being provided with chambers receiving said pistons, and means to control communication between the chambers.

2. A shock absorber comprising a casing having oppositely arranged chambers, a rack arranged in said casing and having oppositely arranged pistons arranged in said chambers, a main shaft having a gear engaged with said rack, said casing being provided with passages communicating with said chambers, and means whereby to obstruct said passages when the shaft is rotated beyond a predetermined point.

3. A shock absorber comprising a casing having chambers adapted for the reception of a fluid, a rack having pistons arranged in said chambers, said casing being provided with a passage establishing communication between said chambers, and means whereby to obstruct said passage when the vehicle spring action exceeds a predetermined point.

4. A shock absorber comprising a casing having chambers adapted for the reception of a fluid, a rack having pistons arranged in said chambers, said casing being provided with a passage establishing communication between said chambers, means whereby to obstruct said passage when the vehicle spring action exceeds a predetermined point, said casing being provided with a by-pass of a less cross sectional area than said passage and forming a means for establishing a constant communication between the chambers whereby the fluid may flow from one chamber to the other.

5. A shock absorber comprising a casing having chambers adapted for the reception of a fluid, a rack having pistons arranged in said chambers, said casing being provided with a passage establishing communication between said chambers, means whereby to obstruct said passage when the vehicle spring action exceeds a predetermined point, said casing being provided with a by-pass of a less cross sectional area than said passage and forming a means for establishing a constant communication between the chambers whereby the fluid may flow from one chamber to the other, and an operating arm having connection with said rack.

6. A shock absorber comprising a casing having chambers and a pair of passage ways establishing communication between said chambers, there being a by-pass between said passage ways, said passage ways being provided with lateral branches having seats, valves arranged in said lateral branches and adapted for contacting with said seats, and a collar having means whereby to normally hold the valves in open position.

7. A shock absorber comprising a casing having chambers and means establishing communication between the said chambers, valves adapted for controlling said means, and a collar having an arcuate lug contacting with said valves whereby to normally hold the same in open positions.

8. A shock absorber comprising a casing having chambers and means establishing communication between said chambers, valves adapted for controlling said means, a collar having an arcuate lug contacting with said valves whereby to normally hold the same in open positions, and an annulus adapted for positioning said collar.

9. A shock absorber comprising a casing having chambers and means establishing communication between said chambers, valves adapted for controlling said means, a collar having an arcuate lug contacting with said valves whereby to normally hold the same in open positions, an annulus adapted for positioning said collar, and springs connecting said collar to said annulus.

10. A shock absorber comprising a casing having chambers and means establishing communication between said chambers, valves adapted for controlling said means, a collar having an arcuate lug contacting with said valves whereby to normally hold the same in open positions, an annulus adapted for positioning said collar, springs connecting said collar to said annulus, and a gear having connection with said annulus.

11. A shock absorber comprising a casing having chambers and means establishing communication between said chambers, valves adapted for controlling said means, a collar having an arcuate lug contacting with said valves whereby to normally hold the same in open positions, an annulus adapted for positioning said collar, springs connecting said collar to said annulus, a gear having connection with said annulus, and a rack connected to said gear and having pistons arranged in said chambers.

12. A shock absorber comprising a casing having chambers and means establishing communication between said chambers, valves adapted for controlling said means, a collar having an arcuate lug contacting with said valves whereby to normally hold the same in open positions, an annulus adapted for positioning said collar, springs connecting said collar to said annulus, a gear having connection with said annulus, a rack connected to said gear and having pistons arranged in said chambers, and means whereby to limit the rotation of said annulus.

13. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, and an annulus connected to said springs and having means in cooperation with the casing whereby the annulus is limited in its rotation.

14. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the same is limited in its rotation, and a vehicle spring operated shaft having a gear connected to said rack.

15. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the annulus is limited in its rotation, a vehicle spring operated shaft having a gear connected to said rack, and means urging said annulus flatly into engagement with said gear.

16. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the annulus is limited in its rotation, a vehicle spring operated shaft having a gear connected to said rack, and means urging said annulus flatly into engagement with said gear, said last named means being provided with a packing.

17. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the annulus is limited in its rotation, a vehicle spring operated shaft having a gear connected to said rack, and means urging said annulus flatly into engagement with said gear, said casing being provided with a by-pass constantly maintaining communication between said passages.

18. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the annulus is limited in its rotation, a vehicle spring operated shaft having a gear connected to said rack, means urging said annulus flatly into engagement with said gear, said casing being provided with a by-pass constantly maintaining communication between said passages, and an arm connected to said shaft.

19. A shock absorber comprising a casing having chambers, a rack having pistons arranged in said chambers, said casing being provided with passages communicating with said chambers, said passages having lateral branches, spring actuated valves normally closing said branches, a collar having a radial lug adapted for engaging said valves whereby to normally hold the same in open position, a pair of springs connected to said collar, an annulus connected to said springs and having means in cooperation with the casing whereby the annulus is limited in its rotation, a vehicle spring operated shaft having a gear connected to said rack, means urging said annulus flatly into engagement with said gear, said casing being provided with a by-pass constantly maintaining communication between said passages, an arm connected to said shaft, and a link connecting said arm to the vehicle spring.

20. A shock absorber comprising a casing having chambers and a pair of passages establishing communication between said chambers, there being a by-pass between said passages, spring actuated valves interposed in said passages, means to normally hold the valves in open position, and means to create a pressure in one of said passages whereby to seat one of the valves and temporarily hold said means in a set position.

21. A shock absorber comprising a casing having passages, spring actuated ball valves for closing said passages, a rib engaging the said ball valves and normally unseating the same, and means to create a pressure in one of said passages and hold one of the valves seated and thereby hold said rib in a set position, and means to connect the rib to one of two bodies movable with relation to each other.

22. A shock absorber for vehicles comprising a casing, having chambers, spring actuated valves associated with said chambers, a valve unseating member normally holding said valves in open position, means operated by the movement of the vehicle to operate said valve unseating member, and means to create a pressure in said chambers whereby to force one of said valves to its seated position and to hold said valve unseating member in a set position.

ENOS HENRY KREIDER.